(12) United States Patent
Teranishi

(10) Patent No.: US 10,171,172 B2
(45) Date of Patent: Jan. 1, 2019

(54) OPTICAL TRANSMITTER OPERABLE FOR PULSE-AMPLITUDE MODULATION SIGNAL

(71) Applicant: SUMITOMO ELECTRIC DEVICE INNOVATIONS, INC., Yokohama (JP)

(72) Inventor: Ryouta Teranishi, Yokohama (JP)

(73) Assignee: SUMITOMO ELECTRIC DEVICE INNOVATIONS, INC., Yokohama (JP)

( * ) Notice: Subject to any disclaimer, the term of this patent is extended or adjusted under 35 U.S.C. 154(b) by 0 days.

(21) Appl. No.: 15/604,048

(22) Filed: May 24, 2017

(65) Prior Publication Data

US 2017/0346570 A1    Nov. 30, 2017

(30) Foreign Application Priority Data

May 27, 2016   (JP) .................. 2016-106372
May 27, 2016   (JP) .................. 2016-106373
May 27, 2016   (JP) .................. 2016-106374

(51) Int. Cl.
*H04B 10/54*     (2013.01)
*H04B 10/50*     (2013.01)
*H04B 10/516*    (2013.01)

(52) U.S. Cl.
CPC ....... *H04B 10/505* (2013.01); *H04B 10/5161* (2013.01)

(58) Field of Classification Search
CPC .................................................. H04B 10/541
See application file for complete search history.

(56) References Cited

U.S. PATENT DOCUMENTS

2007/0183790 A1*  8/2007  Matsumoto .......... H04B 10/505
                                                      398/182
2016/0327816 A1* 11/2016  Nagarajan ............... G02F 1/225
2017/0063466 A1*  3/2017  Wang ................. H04B 10/5161

FOREIGN PATENT DOCUMENTS

JP           2002-141956 A      5/2002

* cited by examiner

*Primary Examiner* — Shi K Li
(74) *Attorney, Agent, or Firm* — Venable LLP; Michael A. Sartori; Tamatane J. Aga

(57) ABSTRACT

An optical transmitter that outputs an optical signal with a pulse amplitude modulation (PAM) configuration is disclosed. The optical transmitter includes a light-generating device and a driver. The light-generating device has non-linearity in a transfer characteristic between the electrical driving signal and the optical signal. The driver includes a PAM signal generator, a level controller, and an output driver. The PAM signal generator receives the input electrical signal and outputs a PAM signal. The level controller adjusts the electrical levels of the PAM signal based on the non-linear transfer characteristic of the light-generating device, where the electrical levels set the optical levels of the optical signal with preset ratios. The output driver generates the driving signal by superposing the electrical levels adjusted by the level controller with the PAM signal provided from the PAM signal generator.

21 Claims, 17 Drawing Sheets

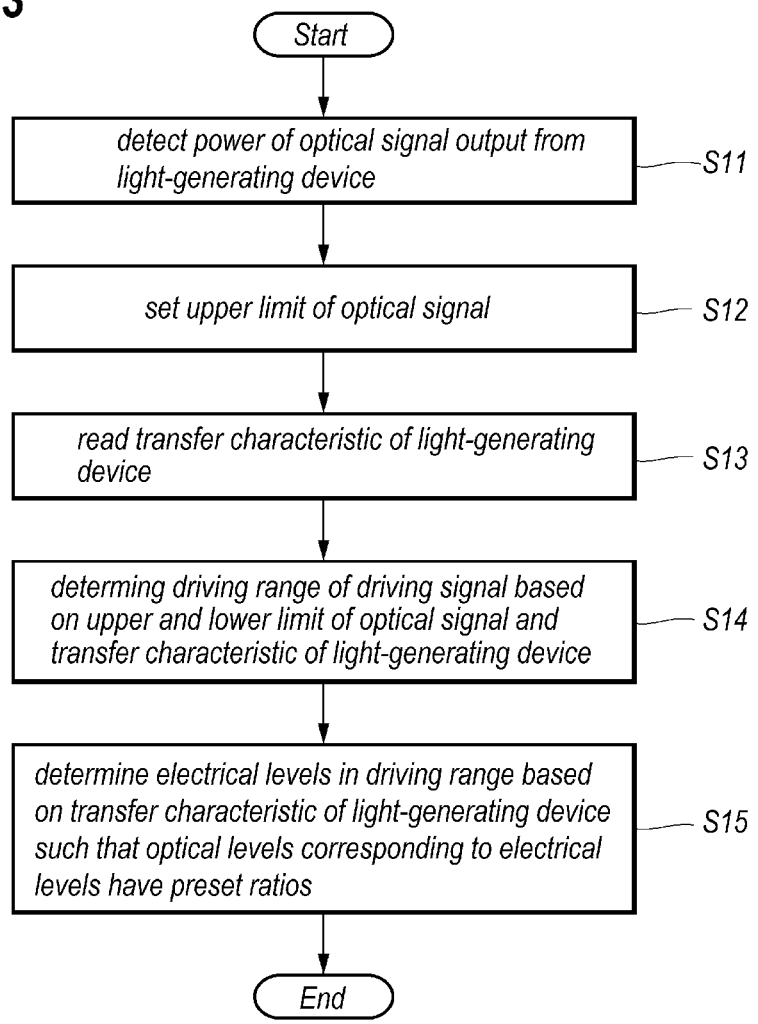

Fig. 4A
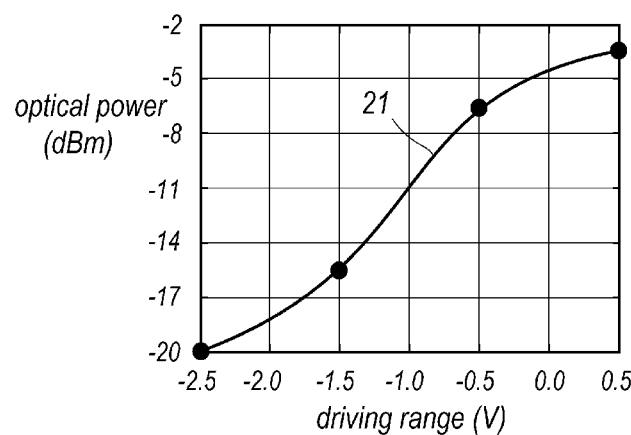
Fig. 4C
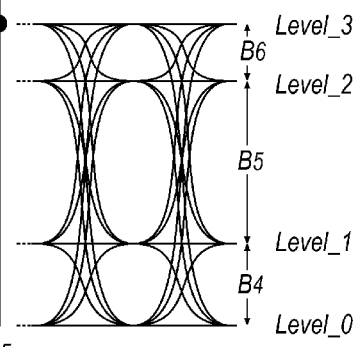
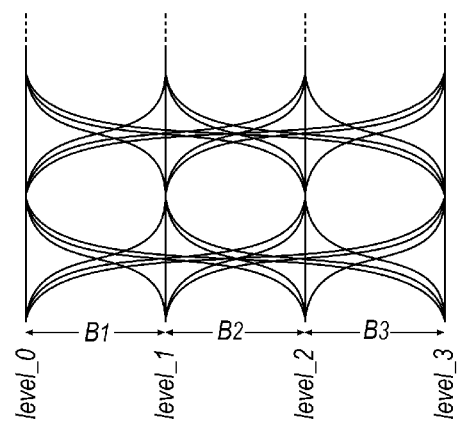
Fig. 4B

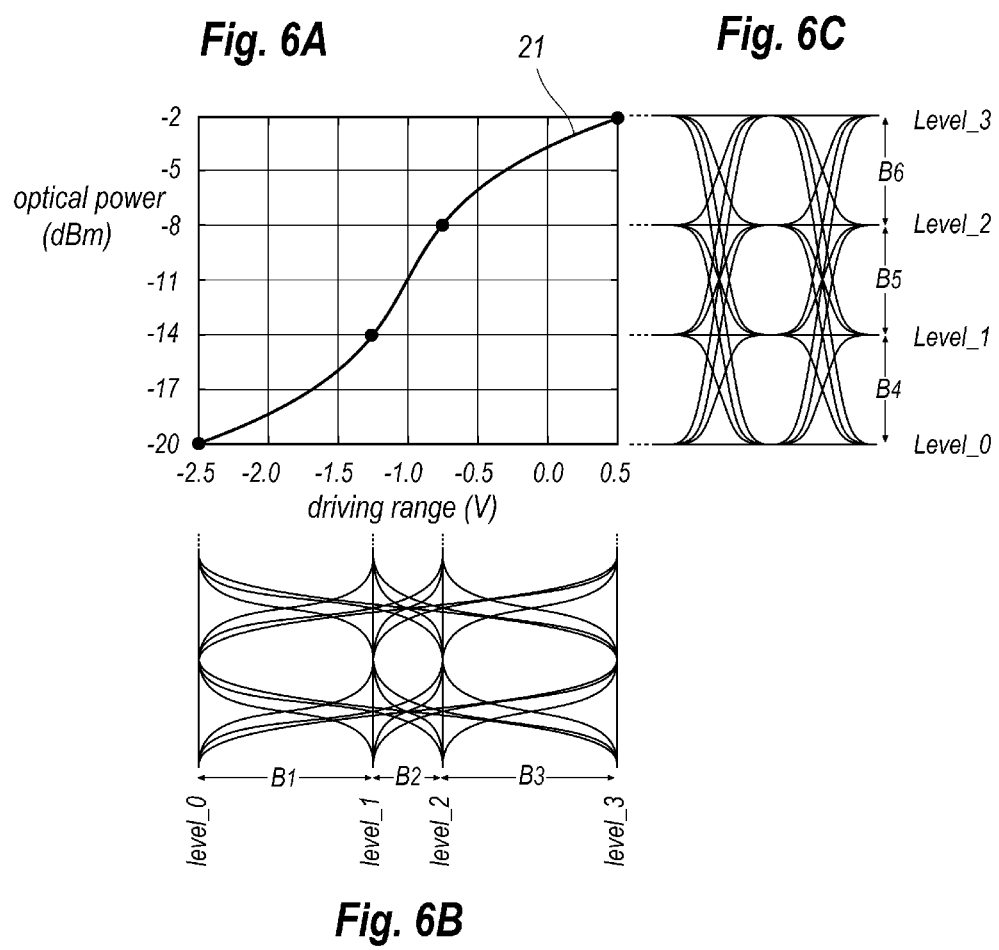

Fig. 8A
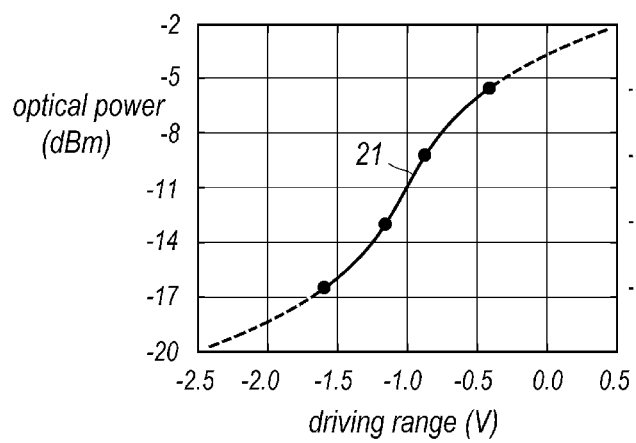
Fig. 8C
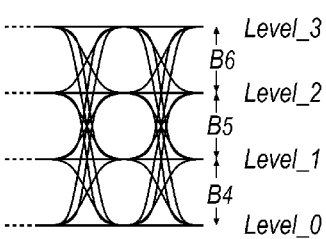
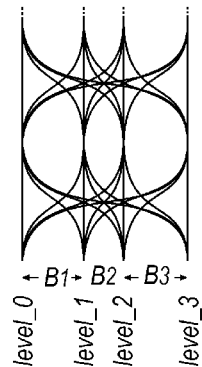
Fig. 8B

Fig. 9A
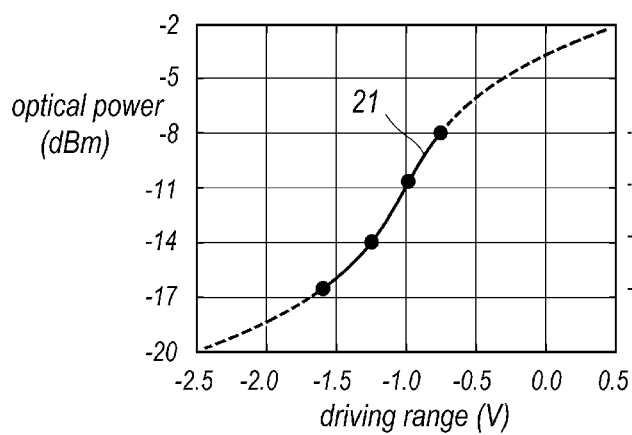
Fig. 9C
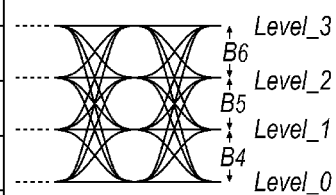
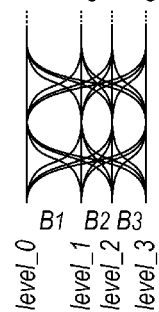
Fig. 9B

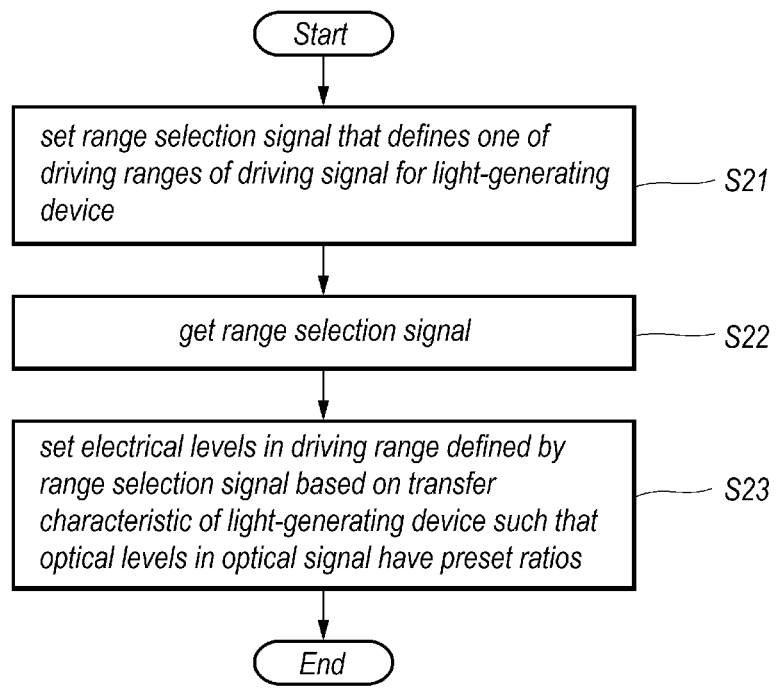

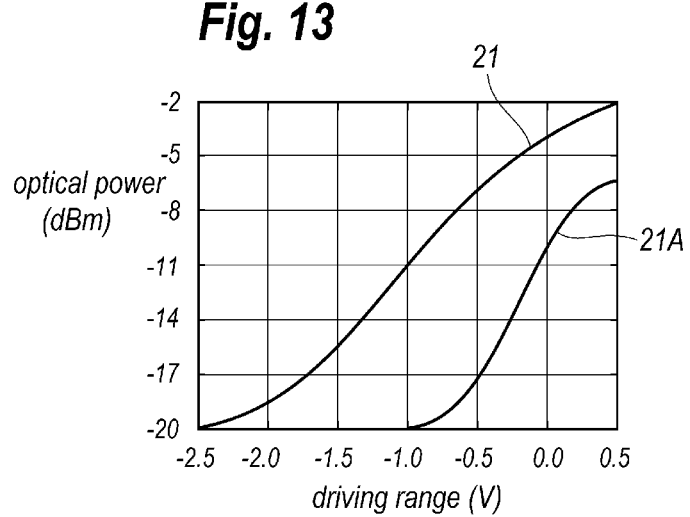

Fig. 14A
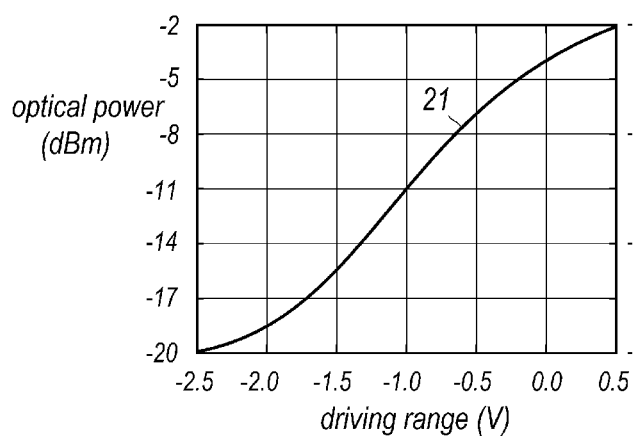
Fig. 14C
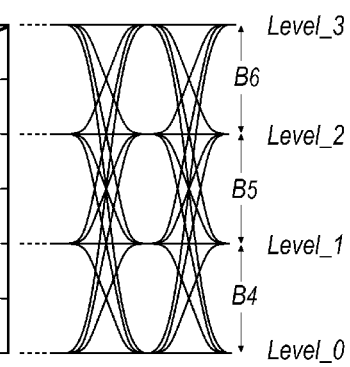
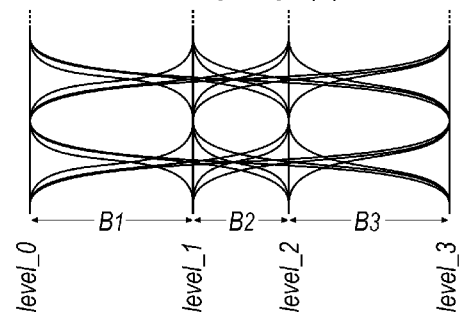
Fig. 14B

Fig. 15A
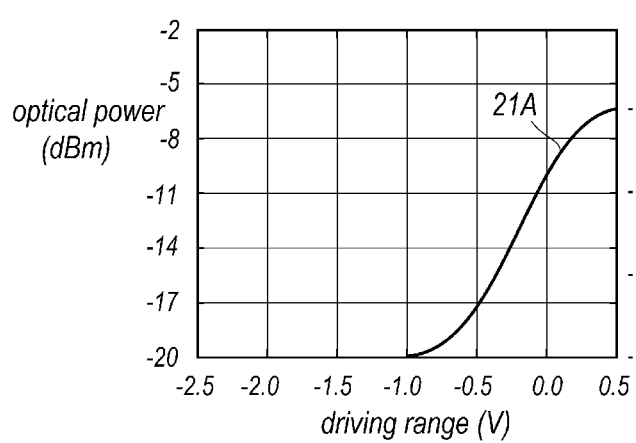
Fig. 15C
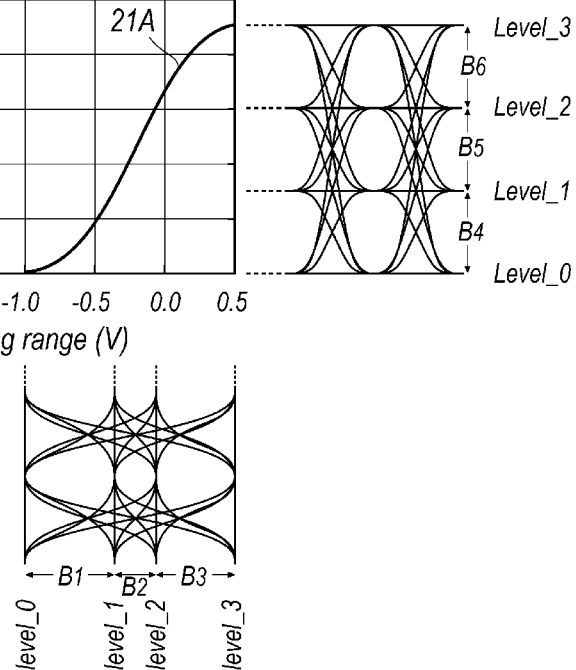
Fig. 15B

OPTICAL TRANSMITTER OPERABLE FOR PULSE-AMPLITUDE MODULATION SIGNAL

BACKGROUND OF THE INVENTION

1. Field of the Invention

The present invention relates to a method of controlling an optical transmitter outputting an optical signal with multi-levels corresponding to a pulse-amplitude modulation (PAM) signal.

2. Background Arts

A Japanese Patent Application laid open No. JP-2002-141956A has disclosed an optical receiver capable of adjusting a decision level for discriminating a high level from a low level automatically depending on an input optical signal. The optical receiver disclosed therein includes an optical detector, a decision unit for automatically creating the decision level, and a clock extractor that extracts a clock involved within the input optical signal and provides thus extracted clock to the decision unit.

A technique generally called as the pulse amplitude modulation (PAM) has been known and practically applied within a communication system that is necessary to transmit a mass data with extremely high speed. For instance, when the communication system configures with the PAM4 architecture that uses four optical levels each denoting two bits data from "00" to "11", namely, PAM4 architecture, the system first generates the PAM4 signal with four electrical levels to be provided to an optical source, typically a semiconductor laser diode (LD). The PAM4 signal is then provided to the LD and the LD emits light with four optical levels. An optical receiver set apart from the optical source receives the PAM4 optical signal and recovers data therefrom.

The LD, in particular the transfer characteristic from an electrical signal to an optical signal, which is often called as the I-L characteristic, inevitably shows a non-linearity between the optical output and the electrical input. Accordingly, an LD that receives the PAM4 signal with the four electrical levels often generates an optical signal with four optical levels reflecting the non-linearity of the I-L characteristic of the LD. That is, the four levels in the optical signal output from the LD show uneven differences even when the electrical signal input thereto with the four levels evenly distributed each other.

SUMMARY OF THE INVENTION

One aspect of the present invention relates to an optical transmitter that outputs an optical signal with the pulse amplitude modulation (PAM) configuration and includes a light-generating device and a driver for driving the light-generating device. The light-generating device may generate the optical signal by receiving an electrical driving signal from the driver. The light-generating device has non-linearity in a transfer characteristic from the electrical driving signal to the optical signal. The driver may generate the electrical driving signal by receiving an input electrical signal. The driver includes a PAM signal generator, a level controller, and an output driver. The PAM signal generator may output a PAM signal by receiving an input signal. The level controller may adjust electrical levels of the PAM signal based on the transfer characteristic of the light-generating device, where the electrical levels sets optical levels of the optical signal to have preset ratios. The output driver may generate the electrical driving signal by superposing the electrical levels adjusted by the level controller with the PAM signal provided from the PAM signal generator.

Another aspect of the present invention relates a method of controlling an optical transmitter that outputs an optical signal with n of optical levels. The method comprises steps of: (1) determining a full range of the optical signal by setting an upper limit and a lower limit thereof; (2) dividing the full range of the optical signal into n−1 sub-ranges by setting the n of the optical levels including the upper and lower limits of the full range such that the n of the optical levels have preset ratios; and (3) determining n of electrical levels of an electrical driving signal based on a non-linear transfer characteristic of a light-generating device from the electrical driving signal to the optical signal, where the light-generating device is driven by the electrical driving signal.

BRIEF DESCRIPTION OF THE DRAWINGS

The foregoing and other purposes, aspects and advantages will be better understood from the following detailed description of a preferred embodiment of the invention with reference to the drawings, in which:

FIG. 3 shows a flow chart to compensate the optical signal in the optical levels thereof by the electrical signal in the electrical levels according to the embodiment of the present application;

FIGS. 4A to 4C show, for the light-generating device, the transfer characteristic thereof, the eye-diagram of the electrical signal input thereto, which is not compensated in the levels thereof, and the eye-diagram of the optical signal output therefrom, respectively;

FIGS. 6A to 6C show, for the light-generating device, examples of the transfer characteristic thereof, the eye-diagram of the electrical signal input thereto, which is compensated in the levels thereof, and the eye-diagram of the optical signal output therefrom, respectively;

FIGS. 8A to 8C show, for the light-generating device, still another examples of the transfer characteristic thereof, the eye-diagram of the electrical signal input thereto, which is compensated in the levels thereof, and the eye-diagram of the optical signal output therefrom, respectively;

FIGS. 9A to 9C show, for the light-generating device, still another examples of the transfer characteristic thereof, the eye-diagram of the electrical signal input thereto, which is compensated in the levels thereof, and the eye-diagram of the optical signal output therefrom, respectively;

FIG. 10 shows a flow chart for compensating the non-linearity between the optical signal in the optical levels thereof and the electrical signal in the electrical levels thereof;

FIG. 13 shows temperature dependences of the transfer characteristic of the light-generating device implemented in the optical transmitter shown in FIG. 12;

FIGS. 14A to 14C show, for the light-generating device, an example of the transfer characteristic thereof, the eye-diagram of the electrical signal input thereto, which is compensated in the levels thereof, and the eye-diagram of the optical signal output therefrom, respectively, at a room temperature;

FIGS. 15A to 15C show, for the light-generating device, an example of the transfer characteristic thereof, the eye-diagram of the electrical signal input thereto, which is compensated in the levels thereof, and the eye-diagram of the optical signal output therefrom, respectively, at a temperature considerably higher than the room temperature;

DESCRIPTION OF EMBODIMENT

Next, some preferred embodiment according to the present invention will be described as referring to accompanying drawings. In the description of the drawings, numerals or symbols same with or similar to each other will refer to elements same with or similar to each other without duplicating explanations.

First Embodiment

Figure 1:
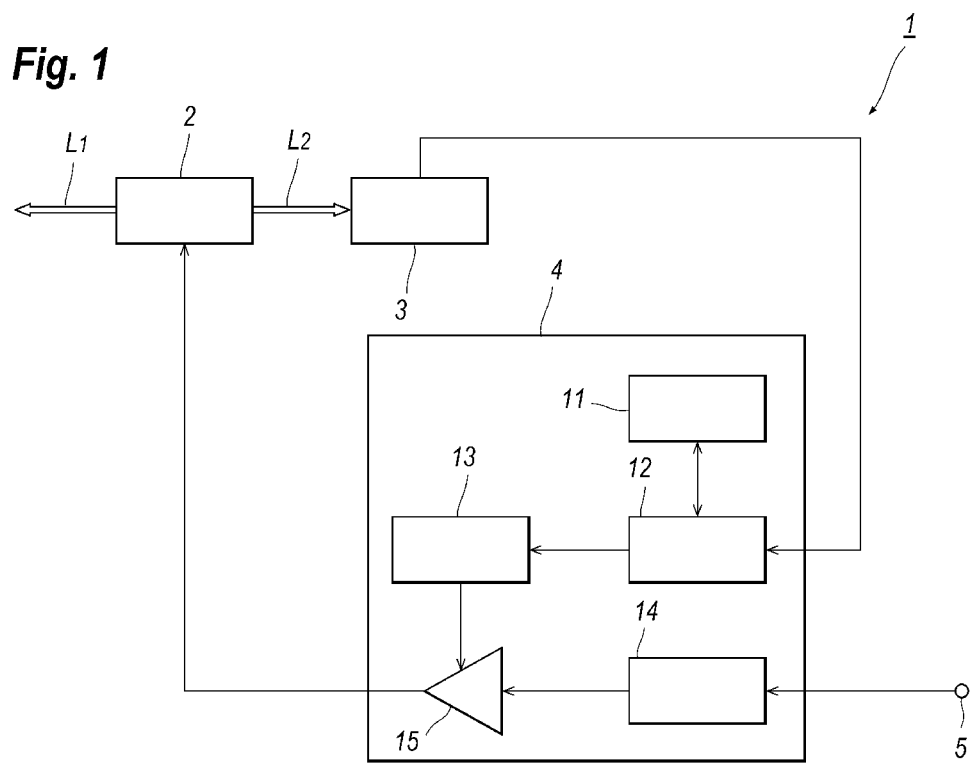
FIG. 1 is a functional block diagram of an optical transmitter according to the first embodiment of the present application.

FIG. 1 shows a functional block diagram of an optical transmitter according to the first embodiment of the present invention. The optical transmitter 1 shown in FIG. 1 may be applicable to an optical communication system configured with a pulse amplitude modulation (PAM). The optical transmitter 1 may convert an input electrical signal into a PAM signal, and may output an optical signal modulated by the PAM signal. The optical transmitter 1 of the present embodiment includes a light-generating device 2, an optical detector 3, a driver 4, and an input terminal 5.

The light-generating device 2 is a type of an electro-absorption modulator integrating with a semiconductor laser diode (LD), which is often called as an EML. The light-generating device 2 has a feature that the semiconductor laser diode generates continuous wave (CW) light supplied with a DC bias while the electro-absorption modulator (EM) modulates this CW light provided with a driving signal that has the PAM configuration. Thus, the light-generating device may emit a front optical signal L1 with the PAM configuration and a rear optical signal L2 with the CW configuration.

The optical detector 3, which optically couples with the light-generating device 2, may detect the rear optical signal L2. The present embodiment provides a photodiode (PD) as the optical detector 3. The optical detector 3 may detect power of the CW light.

The driver 4 may have a function to electrically drive the light-generating device 2 and hold various parameters for operating the light-generating device 2. The driver 4 is electrically connected to the light-generating device 2, the optical detector 3, and the input terminal 5. Although the present embodiment provides the driver 4 as a single element or chip, the optical transmitter 1 may divide functions of the driver 4 in respective elements or chips. The driver 4 may provide a memory 11, a controller 12, a level controller 13, a PAM signal generator 14, and an output driver 15.

Figure 2A:
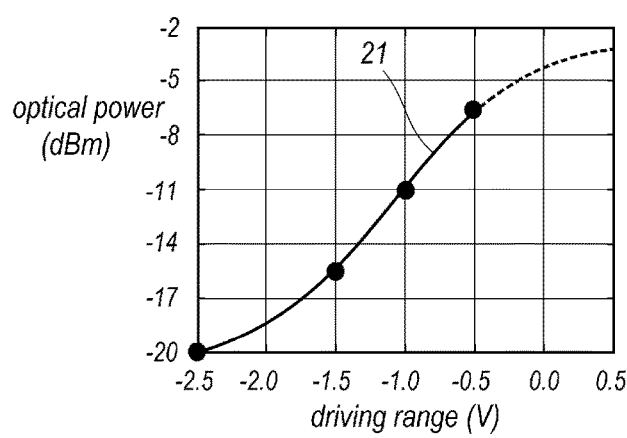
FIGS. 2A to 2C show, for a light-generating device implemented in the optical transmitter of FIG. 1, a transfer characteristic thereof, an eye-diagram of an electrical signal input thereto, and an eye-diagram of an optical signal output therefrom, respectively.

The functions and operations of the memory 11, the controller 12, the level controller 13, the PAM signal generator 14, and the output driver 15 will be described as referring to FIGS. 2A to 2C, where FIG. 2A shows a transfer characteristic 21 of the light-generating device 2 adjusted in driving performance thereof, which will be described later in this specification. That is, FIG. 2A shows the power of the front optical signal L1 when the light-generating device 2, in particular, the LD in the light-generating device 2 outputs the CW light for the EM and the EM depending on an electrical level of the driving signal attenuates the CW light in the optical power thereof. The horizontal axis shows the level of the driving signal by a unit of voltage (V); while, the vertical axis shows the optical power of the optical signal L1 by a unit of milli-decibel (dBm). FIG. 2B corresponds to an eye-diagram of the driving signal provided to the light-generating device 2, while, FIG. 2C corresponds to another eye-diagram of the optical signal L1.

The memory 11 in the driver 4 may be a type of a read only memory (ROM) that stores parameters for operating the light-generating device 2. The parameters include a relation between the electrical driving signal and the optical signal L1 in the power thereof, which is the transfer characteristic 21 of the light-generating device 2 exemplarily indicated in FIG. 2A.

The controller 12 sets an upper limit in the optical signal of the light-generating device 2 based on detection by the optical detector 3. Receiving a magnitude of a photocurrent output from the optical detector 3, the controller 12 may set the upper limit in the optical signal of the light-generating device 2. For instance, as FIG. 2A indicates; the controller 12 sets the upper limit of the optical signal to be −6.5 dBm.

The level controller 13 may adjust a driving range and electrical levels of the driving signal provided to the light-generating device 2 referring to thus determined upper limit of the optical signal and the transfer characteristic 21 stored in the memory 11. The driving signal provided to the light-generating device 2, which is output from the output driver 15, has the multi-level configuration converted from the PAM signal provided from the PAM signal generator 14. The driving range is a voltage range of the electrical driving signal. As FIG. 2A indicates, the level controller 13, based on the transfer characteristic 21 and the upper limit of the output optical power, may set the driving range to be −2.5 to −0.5V.

The level controller 13 may also set the respective electrical levels of the driving signal according to the transfer characteristic 21 such that the optical levels of the optical signal L1 output from the light-generating device 2 have preset ratios. For instance, the level controller 13 first decides a full range in the optical signal L1, namely, the upper and lower limits of the optical signal, which is requested from the system that implements the present optical transmitter 1. Specifically, the maximum optical power of the CW light output from the LD in the light-generating device becomes substantially equal to power corresponding to the upper limit as the EM causes substantially no attenuation. A relation between the power of the front light L1 and that of the rear light L2 is obtained in advance to the operation of the optical transmitter, the bias supplied to the LD may be determined such that the power of the rear light L2 becomes that corresponding to the upper limit of the front light L1 as the EM causes substantially no attenuation. Then, as the bias supplied to the LD is maintained in the value by which the front light L1 becomes the upper limit, the minimum value of the driving signal may be determined to be a value by which the front light L1 becomes the lower limit of the optical signal. The level controller 13 next sets four optical levels, Level_0 to Level_3, by dividing the full range in the optical signal into three sub-ranges, where the optical levels, Level_0 to Level_3 have preset ratios also requested from the system and stored in the memory 11, where the minimum level, Level_0, corresponds to the lower limit while the maximum level, Level_3, corresponds to the upper limit of the optical signal. Third, the level controller 13 determines four electrical levels, level_0 to level_3, each corresponding to the four optical levels, Level_0 to level_3, by reversely referring to the transfer characteristic 21.

The operation of the level controller 13 is further specifically described. In the first step, the level controller 13 sets the full range in the optical signal L1 to be −20 dBm to −6.5 dBm, which is defined by the system. Then, the bias supplied to the LD in the light-generating device 2 is determined such that the front light L1 in the power thereof becomes the upper limit as the EM causes no attenuation; and, as maintaining the output power of the LD, the minimum value of the electrical level is set such that the power of the optical signal L1 becomes the lower limit. Next, the level controller 13 divides the full range in the optical signal into three sub-ranges. In the explanation below, the three sub-ranges in the optical signal have widths substantially equal to each other, that is, the level controller 13 may evenly divide the full range in the optical signal into three sub-ranges each having the width of 4.5 dBm. Specifically, the level controller 13 regards the optical power of −20 dBm as the Level 0, the optical power of −15.5 dBm as the Level 1, the optical power of −11.0 dBm as the Level 2, and the optical power of −6.5 dBm as the Level 3. Thus, a difference $B_4$ between the Level 1 and the Level 0 becomes 4.5 dBm, that $B_5$ between the Level 2 and the Level 1 also becomes 4.5 dBm, and that $B_6$ between the Level 3 and the Level 2 becomes 4.5 dBm. The level controller 13 finally decides the electrical levels in the driving signal to be −2.5V, −1.5V, −1.0V, and −0.5V, each corresponding to the Level 0 to the Level 3 in the optical power by reversely referring to the transfer characteristic 21 shown in FIG. 2A.

The PAM signal generator 14 may convert the signal provided from the input terminal 5 into a configuration of the PAM signal that is provided to the output driver 15, but the PAM signal thus converted by the PAM signal generator 14 has evenly disposed electrical levels. The output driver 15, by superposing the electrical levels determined by the level controller on the PAM signal coming from the PAM signal generator 14, may generate the driving signal that has the levels, level_0 to level_3, with respective differences therebetween and provide thus generated driving signal to the light-generating device 2. Accordingly, the light-generating device 2 may generate the optical signal L1 that provides the optical levels with substantially even differences and the preset ratios.

The description above concentrates on the operation of the level converter 13 to adjust the electrical levels, level_0 to level_3, in the driving signal so as to evenly dispose the optical levels, Level_0 to Level_3, in the optical signal. However, the communication system implementing the optical transmitter 1 often requests the optical signal with the PAM configuration such that cross points in the eye diagram thereof to be set in respective centers between the optical levels neighbor to each other. In such a scheme, the level controller 13 is further requested to adjust cross points in the eye diagram of the driving signal. Specifically, as FIG. 2B shows, the cross point between the levels, level_0 and level_1 is closer to the level 0, that between the levels, level_1 and level_2 is set substantially in a center between those two levels, level_1 and level_2, and the cross point between two levels, level_2 and level_3, is set closer to the level 2. Thus, the light-generating device 2 may output the optical signal L1 not only the optical levels, Level_0 to Level_3, with the preset ratios, or the substantially even differences therebetween, but the cross points therebetween to be set substantially in the center between the two optical levels.

Next, an algorithm for operating the optical transmitter 1 according to the present embodiment will be described as referring to FIG. 3 that shows a flow chart for operating the optical transmitter 1, exactly, for generating the optical signal with the PAM configuration. The optical transmitter 1 detects at the first step S11 the power of the rear optical signal L2 of the light-generating device 2 through the optical detector 3 as varying the bias supplied thereto and the driving signal supplied to the EM is set constant in a value by which the EM causes substantially no attenuation.

Next in the second step S12, the controller 12 determines the upper and lower limits of the optical signal, and the transfer characteristic of the light-generating device 2, in particular, the attenuation characteristic of the EM in the light-generating device 2. As described, because the upper and lower limits of the optical signal are determined by the system, the level controller first adjusts the bias supplied to the LD such that, as the EM is set in a status of the no attenuation, the optical detector 3 detects the power of the rear light L2 corresponding to the upper limit of the front light L1. Then, as varying the level of the driving signal such that the EM shows substantial attenuation depending on the level of the driving signal, the transfer characteristic of the light-generating device 2 and the minimum level of the driving signal that sets the optical signal L1 in the lower limit are determined. During the determination of the transfer characteristic and the minimum level of the driving signal, the LD in the light-generating device 2 in the power of the CW light is kept constant by an auto-power control (APC) in the value by which the front light L1 becomes the upper limit as the EM shows no attenuation. The steps S11 and S12 may be performed in advance to the practical operation of the optical transmitter 1 and the transfer characteristic thus obtained may be stored in the memory 11.

In the third step S13, which may be performed in the practical operation of the optical transmitter 1 after the shipment thereof, the controller 12 reads the transfer characteristic 21 out from the memory 11. Then, in the fourth step S14, the level controller 13 may determine the driving range of the electrical signal provided to the light-generating device 2 by referring to the transfer characteristic 21 and the upper limit of the optical power determined in step S11.

Finally, in the fifth step S15, the level controller 13 sets the respective electrical levels, level_0 to level_3, in the driving signal based on the transfer characteristic 21 and the driving range of the electrical signal such that the optical levels, Level_0 to Level_3 of the optical signal have respective preset ratios. In the present embodiment, the respective optical levels, Level_0 to Level_3 may be attributed to have substantially even differences. Thus, the optical transmitter 1 may be adjusted in the operation thereof through the steps S11 to S15.

Advantages of the method for operating the light-generating device 2, or the controlling the optical transmitter 1, will be described as referring to FIGS. 4A to 4C that schematically illustrates an operation of an optical transmitter 1 without performing any adjustments for the electrical levels. Similar to FIG. 2A, In FIG. 4A, the horizontal axis corresponds to the electrical driving range, while the vertical axis shows the power of the optical signal L1 output from the light-generating device 2. FIG. 4B exemplarily shows an eye diagram of the driving signal provided to the light-generating device 2, while, FIG. 4C shows an eye diagram of the optical signal L1 output from the light-generating device 2.

The transfer characteristic 21 will be described in detail as comparing FIG. 4A with FIG. 2A. The transfer characteristic 21 roughly divided into three regions, one of which shows a substantial linearity in the optical signal against the electrical driving signal, while, the other two regions putting the former region therebetween distinctively show non-linearity. Specifically, the substantial linearity may be reflected in the driving range of −1.5 to −0.5V, while, other ranges of −2.5 to −1.5V and −0.5 to 0.5V, are attributed to be non-linearity between the driving signal and the optical output.

Accordingly, as FIGS. 4B and 4C show, inputting the driving signal with four levels, level_0 to level_3, that have even differences, $B_1$ to $B_3$, the optical signal L1 output from the light-generating device 2 is remarkably degraded. That is, four optical levels, Level_0 to Level_3, show differences, $B_4$ to $B_6$, with considerable discrepancy. Also, the cross points are offset from a center between two optical levels. Such degraded eye diagram sometimes causes shifts between the designed levels and practically appearing levels. For instance, inputting the driving signal corresponding to the level_1, the optical signal output from the light-generating device 2 sets the level thereof in the Level_2. Therefore, the optical transmitter without the function to compensate the non-linearity in the transfer characteristic between the electrical signal and the optical signal could not transmit the optical signal with the multi-levels correctively. Moreover, when the optical transmitter 1 performs the auto-power control (APC) for the light-generating device 2, namely for the LD therein, which possibly varies the upper limit of the optical output signal L1, the full range of the optical power is necessary to be also varied as the variation of the upper limit. Thus, the control of the electrical signal in the amplitude thereof becomes irregular and extremely complex, which results in the lessor error rates in the data transmission.

Figure 2C:
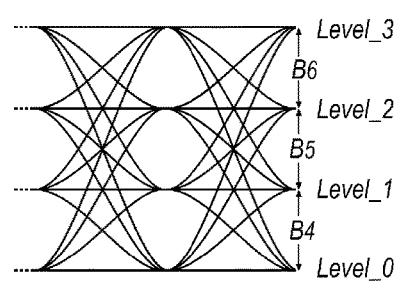
Figure 2B:
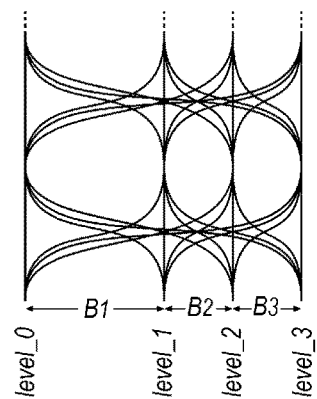

On the other hand, when the optical transmitter 1 performs the correction for the non-linearity in the transfer characteristic as shown in FIG. 2C, the upper limit in the optical signal is set in −6.5 dBm and the driving range of the electrical signal is set from −2.5V to 0.5V in advance to the practical operation of the optical transmitter 1. Also, the electrical levels, level_0 to level_3, in the driving range may be set such that the optical levels, Level_0 to Level_3, have differences substantially equal to each other. Thus, by adjusting the electrical levels in the driving signal so as to set the optical levels in the optical signal having an even difference, the optical transmitter 1 may generate the correct optical signal in the logical levels thereof even when the optical signal has the configuration of the multi-level signal.

The optical transmitter 1 and the method of correcting the electrical levels in the PAM signal are not restricted to those arrangement shown in FIG. 1 and exemplarily shown in FIG. 3, and may have various changes and modifications. For instance, the upper limit in the full range in the optical signal, which is determined by the APC mode in advance to the correction of the electrical levels, is not bounded to be −6.5 dBm, and may be optionally set. Even in such a case, the electrical levels in the driving signal may be determined such that the optical levels in the optical signals may have the preset ratios. Also, the optical levels in the differences therebetween are unnecessary to be evenly set. The differences in the optical levels may be set so as to have preset ratios.

Also, in the arrangement shown in FIG. 1, the optical detector 3 detects the back facet optical signal L2. The optical detector 3 may detect the front optical signal L1 through an optical splitter, a half-mirror, and so on that divides the front optical signal L1 into two portions. The embodiment shown in FIG. 1 receives the PAM4 signal with the PAM configuration. However, the optical transmitter 1, or the algorithm to generate the optical signal with the PAM configuration of the present embodiment, may be applicable to other PAM configurations such as the PAM 8, the PAM 16, and so on.

Second Embodiment

Figure 5:
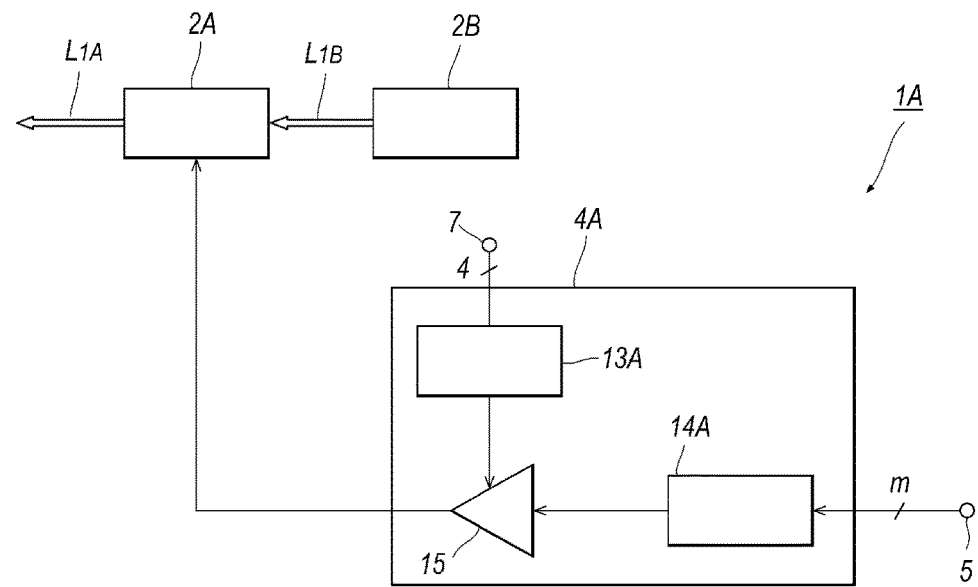
FIG. 5 is a functional block diagram of another optical transmitter according to the second embodiment of the present invention, where the optical transmitter implements an external optical modulator as the light-generating device and a semiconductor laser diode (LD)
Figure 7A:
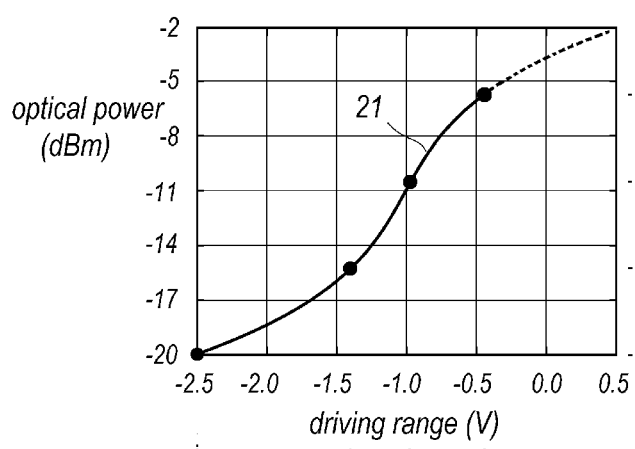
FIGS. 7A to 7C show, for the light-generating device, another examples of the transfer characteristic thereof, the eye-diagram of the electrical signal input thereto, which is compensated in the levels thereof, and the eye-diagram of the optical signal output therefrom, respectively.
Figure 7C:
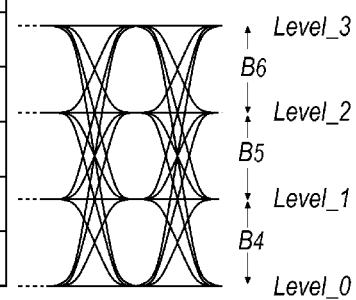
Figure 7B:
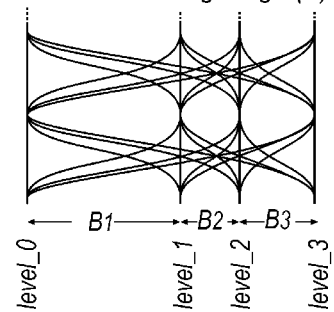

FIG. 5 shows a functional block diagram of an optical transmitter 1A according to the second embodiment of the present invention. The optical transmitter 1A may be also applicable as an optical signal source for an optical communication system attributed to the PAM configuration. The optical transmitter 1A has a feature of, what is called, an indirect modulation optical transmitter that converts an input data into a PAM signal, and may generate an optical signal reflecting the PAM signal. The present optical transmitter 1A may handle four levels PAM signal, namely PAM 4 signal, but the method described below may be applicable to other PAM signals having more levels. The optical transmitter 1A provides a semiconductor laser diode 2B, which is denoted as an LD, a light-generating device 2A, an input terminal 5, a driver 4A that integrates a level controller 13A, a PAM signal generator 14A, and an output driver 15.

The LD 2B may emit CW light L1B to the LIGHT-GENERATING DEVICE 2A, where an upper limit of the optical signal L1B may be set through an automatic power control (APC). Although the optical transmitter 1A has, what is called, the external modulating arrangement for the optical source as shown in FIG. 5; the optical transmitter 1A may provide the function of the direct modulating arrangement where the LD 2B is directly driven by the driver 4A and omits the light-generating device 2A.

The light-generating device 2A of the embodiment, which optically couples with the LD 2B, may be a type of an optical modulator type of an electro-absorption (EA) modulator that generates an optical signal L1A modulated by the driver 4A. A driving signal that drives the light-generating device 2A is provided from the driver 4A, exactly, the output driver 15 in the driver 4A. The driving signal is derived from an input signal with a plural data input to the driver 4A through m of signal lines from the input terminal 5, where m is an integer greater than a unity. Accordingly, the optical signal L1A has $2^m$ levels with the PAM configuration. When m is equal to 2, the optical transmitter 1A is attributed to the PAM 4 configuration. Similarly, when m is 3, 4, and so on, the optical transmitter 1A is attributed to the PAM 8, PAM 16, configurations and so on. In other words, when the optical transmitter 1A is attributed to the PAM n configuration, the input data m is defined by, $m=\log_2(n)=\log_{10}(n)/\log_{10}(2)$.

A relation between the driving signal input to the light-generating device 2A and the optical signal L1A output therefrom depends on the transfer characteristic, or an E/O conversion characteristic, of the light-generating device 2A, specifically, the type of the light-generating device 2A and/or bias levels electrically provided to the light-generating device 2A. The transfer characteristic may be measured in advance to a practical operation; or a shipment of the optical transmitter 1A and may be stored in the driver 4A.

The transfer characteristic of the light-generating device 2A will be specifically described as referring to FIGS. 6A, 7A, 8A, and 9A, where those figures are hereinafter refereed as FIGS. 6A to 9A. In FIGS. 6A to 9A, the horizontal axes denote the driving range in the unit of voltage (V), while, the vertical axes correspond to the optical signal L1A in the unit of milli-decibel (dBm). As FIGS. 6A to 9A explicitly indicate, the transfer characteristic 21 of the light-generating device 2A show a linear region where the optical signal in the power thereof linearly depends on the electrical driving signal; and non-linear regions where the output signal non-linearly increase with respect to the input driving signal. Specifically, the optical signal increases linearly for the driving signal from −1.25 to −0.75V; while, the regions of −2.5 to −1.25 and −0.75 to 0.5V show the non-linear dependence between the driving signal and the output optical power.

The level controller 13A is coupled with the range selector 7 that includes several terminals each directly coupled with the level controller 13A. The range selector 7 receives selection signals that determine one of the driving ranges for the light-generating device 2A, where the driving ranges defined by the upper limit and the lower limit of the driving signal that are determined depending on variations in the performance of the light-generating device 2A. The selection signals, exactly, the number thereof and the terminals to which the selection signals are input, or the combination of the number and the terminals, may select the one of the driving range. Varying the number and the terminals, the optical transmitter 1A may select the one of the driving range for the light-generating device 2A. In the embodiment shown in FIG. 5, four selection signals may determine the driving range.

The driver 4A, which may perform arithmetical operations and stores various parameters for operating the light-generating device 2A, is electrically connected to the light-generating device 2A, the range selector 7, and the input terminal 5. The driver 4A includes the level controller 13A, the PAM signal generator 14A, and the output driver 15. The driver 4A may integrate those units, 13A to 15, on a single semiconductor chip, or, may implement those units in respective discrete units. Next, the operation of the level controller 13A, the PAM signal generator 14A, and the output driver 15 will be described as referring to figures, where FIGS. 6B, 7B, 8B, and 9B, hereinafter denoted as FIGS. 6B to 9B, show eye-diagrams of the driving signal; while, FIGS. 6C, 7C, 8C, and 9C, hereinafter dented as FIGS. 6C to 9C, show eye-diagrams of the optical signal L1A output from the light-generating device 2A.

The level controller 13A may determine the levels, level_0 to level_3, of the driving signal based on the driving range of the transfer characteristic, which is selected by the range selector 7, such that the differences between the levels, Level_0 to Level_3 of the output optical signal L1A have respective preset ratios. For instance, the level selector 13A first receives the range signal from the range selector 7, then, determines the driving range corresponding to the range signal. Second, the level selector 13A determines, based on the transfer characteristic of the light-generating device 2A, the full range of the optical signal L1B corresponding to the driving range; and splits thus determined full range into three sub-ranges each showing the preset widths by setting four levels, Level_0 to Level_3, each having the preset ratios. Finally, the level selector 13A determines the levels, level_0 to level_3, in the driving range each corresponding to the optical levels, Level_0 to Level_3, by reversely referring to the transfer characteristic 21.

The operation of the level controller 13A will be specifically described. For instance, receiving the first range selection signal, the level controller 13A sets the driving range to be −2.5 to +0.5V as shown in FIG. 6A. When the second range selection signal is received, the level controller 13A sets the driving range to be −2.5 to −0.5V. Similarly, the level controller 13A may set the driving range of −1.5 to −0.5V and −1.5 to −0.75V for the third and fourth selection signal, respectively.

Next, the level selector 13A may evaluate the full ranges of the output optical signal L1B corresponding to those driving ranges. Specifically, the level controller 13A sets the full ranges to be −20 to −2 dBm, −20 to −6 dBm, −16 to −6 dBm, and −16 to −8 dBm, for the driving range of −2.5 to +0.5V, −2.5 to −0.5V, −1.5 to −0.5V, and −1.5 to −0.75V, respectively, each corresponding to the first to fourth selection signals.

The level controller 13A next splits thus determined full ranges into three sub-ranges each having the preset widths. In the embodiment described below, the level controller 13A evenly splits the full ranges into three sub-ranges. When the first selection signal is, selected which defines the full range in the output optical signal L1B to be 18 dBm, the respective sub-ranges has widths, B4 to B6, of 6 dBm. Accordingly, the level controller 13A sets the first optical level Level_0 to be −20 dBm, the second optical level Level_1 to be −14 dBm, the third optical level Level_2 to be −8 dBm, and the fourth optical level Level_3 to be −2 dBm in the transfer characteristic 21. Finally, the level controller 13A determines the electrical levels in the driving signal by reversely referring to the transfer characteristic 21 of the light-generating device 2A, that is, the electrical levels of −2.5V, −1.25V, −0.75V, and 0.5V corresponding to the optical levels, Level_0 to Level_3 may be determined. The method described above may be similarly applicable to the second to the fourth selection signals. The preset widths in the differences, B4 to B6, and the optical levels, Level_0 to Level_3, in the optical signal L1A are defined in the specifications in the optical communication system implementing the PAM configuration, and these widths and ratios may be stored in the memory implemented within the driver 4A.

The PAM signal generator 14A may convert the m of the signals input to the input terminal 5 into a PAM signal with n levels with evenly disposed intervals. The PAM signal generator 14A of the present embodiment provides two or more input terminals defined by m ($=\log_2(n)$), where the statuses of the m inputs defines one of the n levels in the PAM n signal. Thus, the PAM signal generator 14A converts the m input signals into one signal with PAM n configuration.

The output driver 15, receiving the PAM n signal from the PAM signal generator 14A, superposes the respective electrical levels determined by the level controller 13A on the PAM n signal, and provides thus generated PAM signal to the light-generating device 2A as the driving signal.

Next, the method for controlling the optical transmitter 1A will be described as referring to a flow chart shown in FIG. 10. The method first selects by the range selector 7 one of the driving ranges at step S21, where the driving ranges are set in advance to the practical operation of the optical transmitter, depending on the variation in the transfer characteristic of the light-generating device 2A.

Then, at step S2, the one of the driving range selected in the first step S21 is input to the level controller 13A. Subsequently, at the third step S23, the level controller 13A determines the levels, level_0 to level_3, of the driving signal such that the differences, B4 to B6, between the optical levels, Level_0 to Level_3, have the preset ratios, or the preset widths substantially equal to each other between the optical levels, Level_0 to Level_3. Thus, the optical transmitter 1A may generate the optical signal L1A including the optical levels, Level_0 to Level_3 with the differences following the specification determined in the communication system by performing the steps S21 to S23.

Similar to the aforementioned embodiment, the level controller 13A may set the cross points appearing in the eye-diagram of the driving signal such that the cross points appearing in the eye-diagram of the optical signal are set in substantially respective centers between the optical levels, Level_0 to Level_3. Thus, the cross points in the eye-diagram of the driving signal are usually offset from respective centers between the electrical levels, level_0 to level_3.

Third Embodiment

Figure 11:
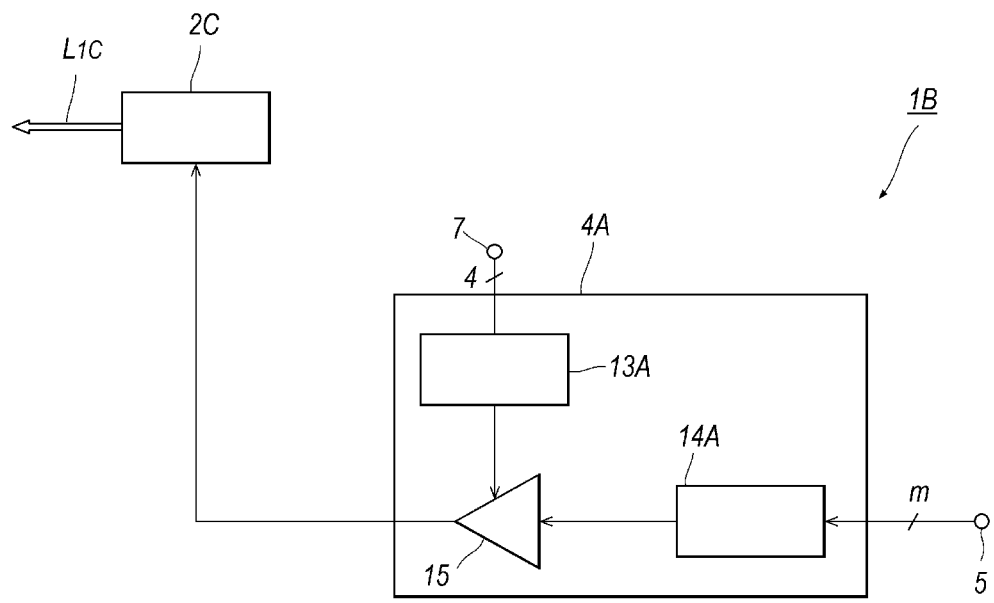
FIG. 11 is a functional block diagram of an optical transmitter according to the third embodiment of the present invention, which is modified from that of the second embodiment shown in FIG. 5.

FIG. 11 shows a functional block diagram of an optical transmitter 1B according to the third embodiment of the present invention. The optical transmitter 1B provides the light-generating device 2C type of an LD directly driven by the driving signal provided from the driver 4A. The driving ranges selected by the range selector 7 may be determined from the current (I) to light (L) characteristic, which is often called as the I-L characteristic, of the LD 2C in advance to the practical operation of the optical transmitter 1B.

The level controller 13A may set the levels, level_0 to level_3, such that the optical signal L1C output from the LD 2C has the multi-levels, Level_0 to Level_3, with the preset ratios and the preset differences therebetween. The method for determining the electrical levels, level_0 to level_3, for the light-generating devices, 2 and 2A may be also applicable to the LD 2C. That is, steps S21 to S23 indicated in FIG. 10 are applicable to the optical transmitter 1B that implements the LD 2C as the light-generating device. Specifically, the step S21 selects one of the driving ranges depending on the I-L characteristic of the present LD 2C. The step S22 reads the range selection signal through the range selector 7. Finally, the step S23 determines the electrical levels, level_0 to level_3, of the driving signal such that the optical levels, Level_0 to Level_3, of the optical signal L1C show the preset ratios and the preset widths therebetween by reversely referring to the I-L characteristic of the LD 2C.

Also in the second and third embodiment, the optical transmitters, 1A and 1B, are configured with the four level PAM signal, PAM4 signal, for driving the light-generating devices, 2A and 2C, respectively. However, the method for determining the electrical levels in the driving signal may be expanded to other PAM configurations, namely, eight levels PAM signal, PAM 8, sixteen level PAM signal, PAM 16, and so on.

Also, the driver 4A of the second and third embodiment selects one of the driving ranges through the range selector 7. That is, the optical transmitters, 1A and 1B, provides the range selector 7 with the multi terminals. However, the driver 4A may provide, instead of the range selector 7, an externally writable register and optionally read one of the driving ranges set in the register. This register, or the driving ranges, may be revised after the shipment of the optical transmitter.

Fourth Embodiment

Figure 12:
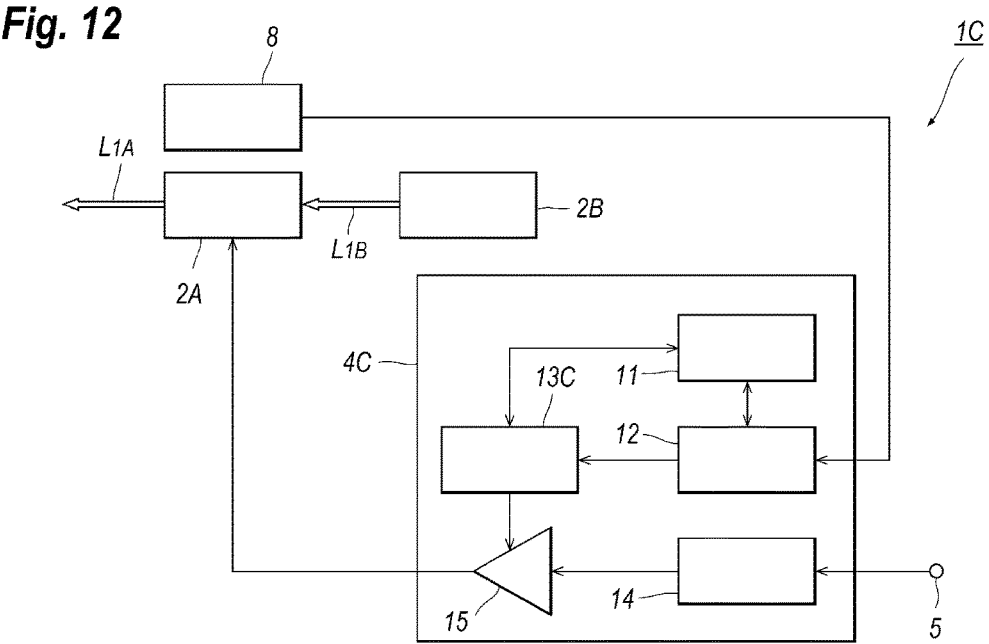
FIG. 12 is a functional block diagram of an optical transmitter according to the fourth embodiment of the present invention.

FIG. 12 is a functional block diagram of still another arrangement of the optical transmitter according to the fourth embodiment of the present invention. The optical transmitter 1C shown in FIG. 12 is also applicable to the communication system configured with the multi-level transmission of the PAM system and implements an optical modulator type of the indirect modulation. The optical transmitter 1C, receiving the PAM signal, may output an optical signal with the multi-levels following the received PAM signal. The present optical transmitter 1C also has the function following the four levels PAM signal. The optical transmitter 1C provides the light-generating device including the LD 2B, the optical modulator type of the EM as the light-generating device 2A, the temperature sensor 8, the driver 4C and the input terminal 5. Although FIG. 12 illustrates that the EM 2A and the LD 2B separately, these two elements, 2A and 2B, may be integrated on a semiconductor chip common to each other. Also, although the explanation below concentrates on an arrangement that the light-generating device 2A is the type of the EM, the light-generating device may be a type of the Mach-Zehnder modulator.

The LD 2B may emit CW light L1B to the light-generating device 2A. The upper limit of the laser light L1B in the optical power thereof may be determined through the APC for the LD 2B. Moreover, the driver 4C may turn-on and turn-off the LD 2B.

The light-generating device 2A, which optically couples with the LD 2B, may modulate the CW light L1B and externally output the optical signal L1A that has the multi-levels in the optical power thereof corresponding to the electrical driving signal with the PAM configuration output from the driver 4C. The transfer characteristic of the light-generating device 2A from the electrical driving signal to the optical signal, which means the attenuation characteristic of the EM 2A, depends on a temperature of the light-generating device 2A.

FIG. 13 explains the temperature dependence of the transfer characteristic of the light-generating device 2A. In FIG. 13, the horizontal axis corresponds to the electrical driving range in the unit of voltage (V), while, the vertical axis corresponds to the power of the optical signal output from the light-generating device 2A in the unit of millidecibel (dBm). When the temperature of the light-generating device 2A is, what is called, a room temperature, the transfer characteristic is typically shown by a behavior 21. On the other hand, when the temperature becomes higher; the transfer characteristic is typically indicated by another behavior 21A. Comparing two behaviors, the upper and lower limits of the electrical driving range, and the upper and lower limits of the optical signal L1A are different.

Referring back to FIG. 12, the temperature sensor 8 may sense the temperature of the light-generating device 2A, which may be, for instance, a thermistor. The driver 4C may perform arithmetic operations and store various parameters for controlling the light-generating device 2A, the LD 2B, and the units within the driver 4C such as the memory 11, the controller 12, the level controller 13, and the PAM signal generator 14.

Next, operations in the driver 4C, in particular, those of the memory 11, the controller 12, the level controller 13, and the PAM signal generator 14 will be described as referring to FIGS. 14 and 15. FIGS. 14A and 15A show the transfer characteristics, 21 and 21A, of the light-generating device 2A at respective temperatures; FIGS. 14B and 15B show the eye-diagrams of the electrical driving signal input to the driver 4C; and FIGS. 14C and 15C show the eye-diagrams of the optical signals L1A output from the light-generating device 2A that is compensated with the levels.

The memory 11 is a type of, what is called, the read only memory (ROM) that stores various parameters for operating the light-generating device 2A. The various parameters stored therein includes various driving ranges depending on temperatures of the light-generating device 2A, which are obtained in advance to the shipment of the optical transmitter 1C.

The controller 12 fetches one of the driving ranges stored in the memory 11 depending on the temperature of the light-generating device 2A measured through the temperature sensor 8. For instance, the controller 12 reads the transfer characteristic 21 shown in FIG. 14A from the ROM 11 based on the temperature of the light-generating device 2A. The level controller 13 sets the driving range, in particular, the levels, level_0 to level_3, at the temperature such that the optical signal shows the optical levels, Level_0 to Level_3, attributed to the preset ratios and the preset widths therebetween. For instance, the level controller 13 may estimate the full range in the optical signal corresponding to the electrical driving range provided to the light-generating device 2A. Then, the level controller 13 may evenly divide the full range thus obtained into three sub-ranges by setting the four optical levels, Level_0 to Level_3. Finally, the level controller 13 calculates the electrical levels, level_0 to level_3 corresponding to the optical levels, Level_0 to Level_3, by reversely referring to the transfer characteristic 21 of the light-generating device 2A. The preset ratios above described are those defined in the specification of the optical communication system implementing the PAM configuration, and preferably stored in the memory 11.

The function of the level controller 13 may be further specifically described. When the level controller 13 receives the temperature of the light-generating device 2A through the temperature sensor 8, the level controller 13 reads one of the transfer characteristics 21 from the memory 11 and sets the full range of the optical signal L1A from −20 dBm to −2 dBm based on the electrical driving range and the transfer characteristic 21 get from the memory. The level controller 13 next divides the full range of the optical signal L1A into three sub-ranges by setting the four optical levels, Level_0 to Level_3. In the embodiment shown in FIG. 14, the level controller 13 evenly divides the full range of the optical signal L1A by the optical levels, namely Level_0 at −20 dBm, Level_1 at −14 dBm, Level_2 at −8 dBm, and Level_3 at −2 dBm, respectively. Thus, the widths, B4 to B6, between the optical levels, Level_0 to Level_3, of the optical signal L1A evenly become 6 dBm. The level controller 13 finally sets the electrical levels, level_0 to level_3, corresponding to the optical levels, Level_0 to Level_3, of −2.5V, −1.3V, −0.65V and +0.5V, respectively. Because of the non-linearity of the transfer characteristic 21 of the light-generating device 2A, the electrical levels, level_0 to level_3, have uneven intervals.

When the controller 12 receives another temperature from the temperature sensor 8, the level controller 13 reads another transfer characteristic 21A from the memory 11 and determines the full range of the optical signal L1a from −20 dBm to −6.5 dBm as shown in FIG. 15B. Then, the level controller 13 evenly divides this full range into three sub-ranges by the four optical levels, Level_0 to Level_3, of −20 dBm, −15.5 dBm, −11 dBm, and −6.5 dBm, respectively. Thus, the widths, B4 to B6, between the optical levels, Level_0 to Level_3, become equal to be 4.5 dBm. That is, the level controller 13 not only increases the lower electrical level level_0 from −2.5V to −1.0V but narrows the widths between the electrical levels, B1 to B3, defined by the electrical levels, level_0 to level_3, of −1.0V −0.4V, −0.1V, and 0.5V, as following the change in the temperature of the light-generating device 2.

Similar to the aforementioned embodiment, the level control 13 also adjusts the cross points appearing tin the eye-diagram of the driving signal such that the cross points in appearing in the eye-diagram of the optical signal L1A are substantially in a center between the optical levels, Level_0 to Level_3, neighbor to each other. The cross points in the eye-diagram of the driving signal are usually offset from the respective centers between the electrical levels, level_0 to level_3, neighbor to each other.

The PAM signal generator 14 converts the input signal provided through the input terminal 5 into the PAM signal but the levels thereof are not corrected yet. In the fourth embodiment shown in FIG. 12, the PAM signal generator 14 may provide m of input terminals and the input terminal may provide the m of the terminals, respectively, for instance, each has 2 terminals for the PAM4 configuration.

The output driver 15 may generate the driving signal provided to the light-generating device 2A from the PAM signal coming from the PAM signal generator 14 and the electrical levels, level_0 to level_3 set by the level controller 13. That is, the electrical levels of the PAM signal provided from the PAM signal generator are not adequate for compensating the non-linearity of the transfer characteristic of the light-generating device 2A. The electrical levels in the signal output from, the PAM signal generator 14 are often distributed as having an even interval. The output driver 15, by receiving the electrical levels, level_0 to level_3, from the level controller 13, may convert the electrical levels of the PAM 4 signal so as to compensate the non-linearity in the transfer characteristic of the light-generating device 2A, which often depends also on the temperature of the light-generating device 2A.

Figure 16:
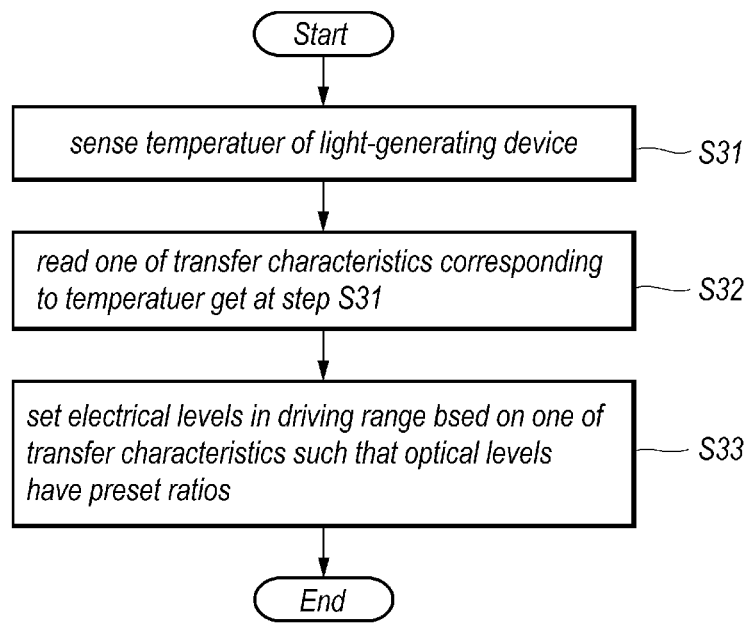
FIG. 16 shows a flow chart for compensating the temperature dependence of the non-linearity in the transfer characteristic of the light-generating device.

FIG. 16 shows a flow chart for controlling the optical transmitter 1C of the present embodiment of the invention. The first step S31 of the control senses the temperature of the light-generating device 2A through the temperature sensor 8. The temperature sensor 8 provides thus sensed temperature to the controller 12 in the driver 4C.

The second step S32 reads by the level controller 13 one of the transfer characteristics of the light-generating device 2A that is stored in the memory 11 as linking with the temperature. Then, the third step S33 sets by the level controller 13, the electrical levels, level_0 to level_3, such that the optical levels, Level_0 to Level_3, corresponding to the electrical levels, level_0 to level_3, have the preset ratios, that is, the optical levels, Level_0 to Level_3, determine the widths, B4 to B6, equal to each other. Thus, the electrical levels, level_0 to level_3, may compensate the non-linearity appearing in the transfer characteristic of the light-generating device 2A. Moreover, the temperature dependence of the transfer characteristic of the light-generating device 2A may be also compensated.

The optical transmitter 1C may perform the procedures for compensating the non-linearity of the transfer characteristic in advance to the practical operation of the optical transmitter 1C, may carry out the compensation during the practical operation, or may intermittently carry out the compensation.

Because the transfer characteristic of the light-generating device 2A often shows the temperature dependence as shown in FIG. 13; the method according to the present invention first senses the temperature of the light-generating device 2A, which means that the driver 4C may select one of the transfer characteristic, for instance, the behavior 21 or 21A, just corresponding to the sensed temperature, and the may adjust the electrical levels, level_0 to level_3, so as to compensate the non-linearity of the transfer characteristic between the electrical signal provided to the light-generating device 2A and the optical signal L1A output therefrom. That is, the optical signal L1A has the optical levels, Level_0 to Level_3, that give not only the even widths, B4 to B6, but the cross point appearing in the eye-diagram to be in a center between the levels. Accordingly, the optical transmitter 1C becomes unnecessary to implement a temperature controller that keeps the temperature of the light-generating device 2A substantially in constant. The optical transmitter 1C may compensate the temperature variation due to the operation thereof. That is, even the optical transmitter 1C provides no temperature controller and the temperature of the light-generating device 2A varies by the operation itself, namely, the supplement of the driving signal to the light-generating device 2A and/or the supplement of a bias current to the LD 2B possibly varies the temperature of the light-generating device 2A, the optical transmitter 1C may output the optical signal with the compensated optical levels, Level_0 to Level_3.

The transfer characteristic of the light-generating device 2A is possibly degraded by a long-term operation thereof. Accordingly, the temperature sensor 8 may sense, instead of the temperature of the light-generating device 2A, may count an accumulative operating time thereof when the light-generating device 2A in the temperature thereof is controlled in a preset temperature by the temperature controller. The memory 11 in the driver 4C may store the some transfer characteristics correlating with the operating time of the light-generating device 2A.

Fifth Embodiment

Figure 17:
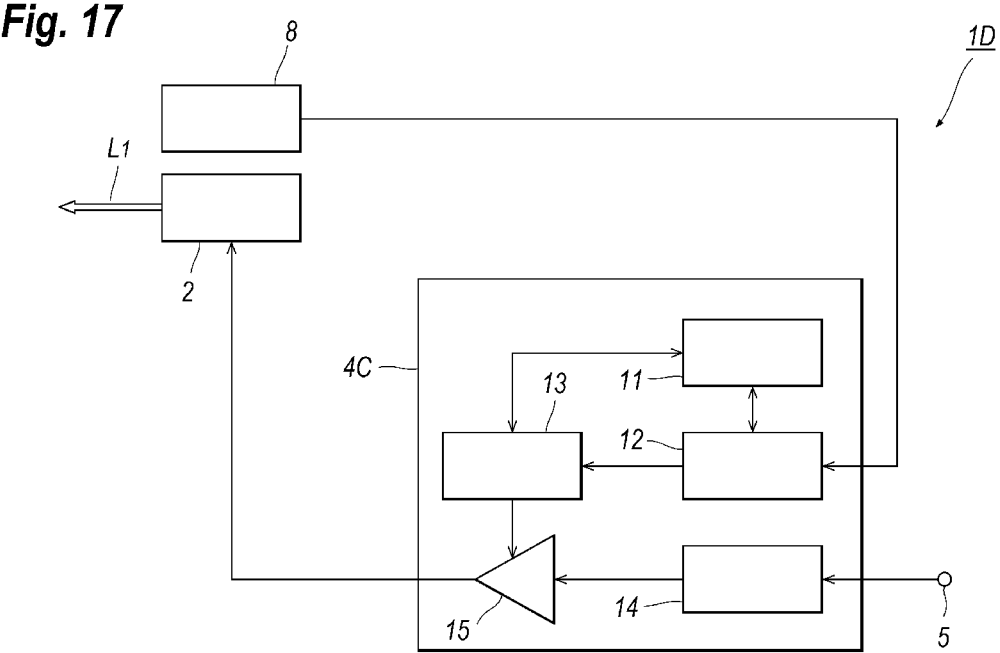
FIG. 17 is a functional block diagram of an optical transmitter modified from the optical transmitter shown in FIG. 12

FIG. 17 is a functional block diagram of still another optical transmitter according to the fifth embodiment of the present invention. The optical transmitter 1d shown in FIG. 17 removes the light-generating device 2A but provides another light-generating device 2 of a type of the direct modulation device similar to that provided in the optical transmitter 1 of the first embodiment. That is, the optical transmitter 1D provides the light-generating device of the type of the LD. The driver 4C, exactly, the output driver 15 therein, provides the driving signal for directly modulating the LD 2. Because the transfer characteristic between the electrical driving signal and the optical output of the LD, which is often called as the I-L characteristic, depends on a temperature of the LD 2, the temperature sensor 8 senses the temperature of the LD 2 and provides thus sensed temperature to the driver 4C.

The memory 11 in the driver 4C stores the I-L characteristics of the LD 2 by linking with the temperature. The controller 12, obtaining the temperature of the LD 2 through the temperature sensor 8, fetches one of the I-L characteristics corresponding to the sensed temperature from the memory 11 and transfer thus fetched I-L characteristic to the level controller 13. The level controller 13, based on the I-L characteristic red out from the memory 11, sets the electrical levels, level_0 to level_3, such that the optical signal L1 output from the LD 2 has the optical levels, Level_0 to Level_3 with the preset ratios, that is, the differences, B4 to B6, have the preset magnitudes. The level controller 13 may also adjust the cross point for the respective intervals in the driving signal such that the cross points appearing in the optical signal L1 become respective centers between the optical levels, Level_0 to Level_3.

Thus, the algorithm to generate the driving signal is applicable to the optical transmitter 1D of the fifth embodiment. That is, the flow chart shown in FIG. 16 may be also implemented within the optical transmitter 1D, exactly, the driver 4C in the optical transmitter 1D. The step S1 senses the temperature of the LD 2, and transfers the sensed temperature to the controller 12 in the driver 4D. The step S2 reads out one of the I-L characteristics corresponding to the sensed temperature from the memory. The step S3 sets the levels, level_0 to level_3, in the driving range such that the optical signal has the optical levels, Level_0 to Level_3, corresponding to the electrical levels, level_0 to level_3, with the preset ratios, or, preset differences, B4 to B6, often substantially equal to each other.

Similar to the temperature sensor 8 in the aforementioned embodiment, the temperature sensor 8 of the present embodiment may also count the operating time of the LD 2. Or, alternatively, the temperature sensor 8 may sense the temperature of the LD 2 concurrently with counting the accumulative operating time of the LD.

The algorithm for controlling the optical transmitter capable of operating with the PAM configuration is not restricted to the embodiment described above. For instance, the optical levels, Level_0 to Level_3, are not always necessary to have the even differences, B4 to B6. Also, the algorithm of the embodiment may be applicable not only to the PAM 4 configuration but to the PAM 8, PAM 16, and so on. The light-generating device 2A in the fourth embodiment, or the LD 2 in the fifth embodiment, may be controlled in the temperatures thereof so as to be within a preset range around a target temperature. Even such an arrangement of the temperature control, the method for generating the driving signal that provides the electrical levels to set the optical levels with the preset ratios shows advantages similar to, or substantially same with, the advantages of the present invention.

The present application claims the benefit of priority of Japanese Patent Applications No. 2016-106372, No. 2016-106373, and No. 2016-106374 each filed on May 27, 2016, which are incorporated herein by references.

I claim:

1. An optical transmitter that outputs an optical signal with a pulse amplitude modulation (PAM) configuration, comprising:
   a light-generating device that generates the optical signal by receiving an electrical driving signal, the light-generating device having non-linearity in a transfer characteristic between the electrical driving signal and the optical signal; and a driver that generates the electrical driving signal by receiving an input electrical signal, the driver including, a PAM signal generator that receives the input electrical signal and outputs a PAM signal, a level controller that adjusts electrical levels of the PAM signal based on the transfer characteristic of the light-generating device, the electrical levels setting optical levels of the optical signal to have preset ratios, and an output driver that generates the electrical driving signal by superposing the electrical levels adjusted by the level controller with the PAM signal provided from the PAM signal generator, wherein the driver further includes a memory that stores a plurality of transfer characteristics, the level controller adjusting the electrical levels based on one of the transfer characteristics read out from the memory.

2. The optical transmitter of claim 1,
wherein the optical levels of the optical signal corresponding to the electrical levels have differences to neighbor optical levels substantially same to each other.

3. The optical transmitter of claim 1,
wherein the light-generating device is a semiconductor laser diode.

4. The optical transmitter of claim 1,
wherein the light-generating device is an optical modulator combined with a semiconductor laser diode.

5. The optical transmitter of claim 4,
wherein the optical modulator is a type of an electro-absorption modulator monolithically integrated with the semiconductor laser diode.

6. The optical transmitter of claim 1,
wherein the level controller further adjusts cross points between the electrical levels in an eye-diagram of the electrical driving signal, the cross points setting cross points in an eye-diagram of the optical signal to be respective centers between the optical levels neighbor to each other in the optical signal.

7. The optical transmitter of claim 1,
wherein the light-generating device provides a semiconductor laser diode (LD) and an electro-absorption modulator (EM), the LD providing continuous wave (CW) light to the EM, the EM modulating the CW light by the electrical driving signal and outputting the optical signal, the EM showing the non-linearity in the transfer characteristic between the electrical driving signal and the optical signal.

8. An optical transmitter that outputs an optical signal with a pulse amplitude modulation (PAM) configuration, comprising:

a light-generating device that generates the optical signal by receiving an electrical driving signal, the light-generating device having non-linearity in a transfer characteristic between the electrical driving signal and the optical signal; and a driver that generates the electrical driving signal by receiving an input electrical signal, the driver including, a PAM signal generator that receives the input electrical signal and outputs a PAM signal, a level controller that adjusts electrical levels of the PAM signal based on the transfer characteristic of the light-generating device, the electrical levels setting optical levels of the optical signal to have preset ratios, and an output driver that generates the electrical driving signal by superposing the electrical levels adjusted by the level controller with the PAM signal provided from the PAM signal generator;

a temperature sensor that senses a temperature of the light-generating device and provides the temperature to the driver, wherein the light-generating device has a transfer characteristic depending on the temperature thereof, and wherein the level controller in the driver adjusts the electrical levels based on the temperature provided from the temperature sensor and the transfer characteristic of the light-generating device at the temperature.

9. The optical transmitter of claim 8,
wherein the driver includes a memory that stores a plurality of the transfer characteristics correlating with temperatures of the light-generating device, and
wherein the level controller reads one of the transfer characteristics corresponding to the temperature of the light-generating device provided from the temperature sensor.

10. The optical transmitter of claim 8,
wherein the optical levels of the optical signal corresponding to the electrical levels have differences to neighbor optical levels substantially same to each other.

11. The optical transmitter of claim 8,
wherein the light-generating device is a semiconductor laser diode.

12. The optical transmitter of claim 8,
wherein the light-generating device is an optical modulator combined with a semiconductor laser diode.

13. The optical transmitter of claim 8,
wherein the level controller further adjusts cross points between the electrical levels in an eye-diagram of the electrical driving signal, the cross points setting cross points in an eye-diagram of the optical signal to be respective centers between the optical levels neighbor to each other in the optical signal.

14. The optical transmitter of claim 8,
wherein the light-generating device provides a semiconductor laser diode (LD) and an electro-absorption modulator (EM), the LD providing continuous wave (CW) light to the EM, the EM modulating the CW light by the electrical driving signal and outputting the optical signal, the EM showing the non-linearity in the transfer characteristic between the electrical driving signal and the optical signal.

15. An optical transmitter that outputs an optical signal with a pulse amplitude modulation (PAM) configuration, comprising:

a light-generating device that generates the optical signal by receiving an electrical driving signal, the light-generating device having non-linearity in a transfer characteristic between the electrical driving signal and the optical signal; and a driver that generates the electrical driving signal by receiving an input electrical signal, the driver including, a PAM signal generator that receives the input electrical signal and outputs a PAM signal, a level controller that adjusts electrical levels of the PAM signal based on the transfer characteristic of the light-generating device, the electrical levels setting optical levels of the optical signal to have preset ratios, and an output driver that generates the electrical driving signal by superposing the electrical levels adjusted by the level controller with the PAM signal provided from the PAM signal generator, wherein the driver counts an accumulative operating time of the light-generating device and further includes a memory that stores a plurality of the transfer characteristics correlating with the accumulative operating time of the light-generating device, and wherein the level controller reads out one of the transfer characteristics corresponding to the accumulative operating time counted by the driver from the memory and adjusts the electrical levels based on the one of the transfer characteristics.

16. The optical transmitter of claim 15,
wherein the optical levels of the optical signal corresponding to the electrical levels have differences to neighbor optical levels substantially same to each other.

17. The optical transmitter of claim 15,
wherein the light-generating device is a semiconductor laser diode.

18. The optical transmitter of claim 15,
wherein the light-generating device is an optical modulator combined with a semiconductor laser diode.

19. The optical transmitter of claim 18,
wherein the optical modulator is a type of an electro-absorption modulator monolithically integrated with the semiconductor laser diode.

20. The optical transmitter of claim 15,
wherein the level controller further adjusts cross points between the electrical levels in an eye-diagram of the electrical driving signal, the cross points setting cross points in an eye-diagram of the optical signal to be respective centers between the optical levels neighbor to each other in the optical signal.

21. The optical transmitter of claim 15,
wherein the light-generating device provides a semiconductor laser diode (LD) and an electro-absorption modulator (EM), the LD providing continuous wave (CW) light to the EM, the EM modulating the CW light by the electrical driving signal and outputting the optical signal, the EM showing the non-linearity in the transfer characteristic between the electrical driving signal and the optical signal.

* * * * *